United States Patent [19]

Krekow et al.

[11] 3,743,411

[45] July 3, 1973

[54] ELECTROGRAPHIC RECORDING METHOD AND DEVICES FOR PERFORMING THIS METHOD

[75] Inventors: Gerhard Krekow, Hamburg; Jurgen Schramm, Norderstedt; Klaus Witter, Hamburg, all of Germany

[73] Assignee: U.S. Philips Corporation, New York, N.Y.

[22] Filed: Jan. 14, 1972

[21] Appl. No.: 217,764

[30] Foreign Application Priority Data

Jan. 15, 1971 Germany .................. P 21 01 770.9

[52] U.S. Cl. ........................ 355/17, 117/17.5, 355/3

[51] Int. Cl. ........................................... G03g 13/00

[58] Field of Search ............................ 355/17, 3, 15; 117/17.5

[56] References Cited

UNITED STATES PATENTS

| | | | |
|---|---|---|---|
| 2,919,170 | 12/1959 | Epstein | 355/3 X |
| 2,716,826 | 9/1955 | Huebner | 355/3 X |

*Primary Examiner*—Richard L. Moses

*Attorney*—Frank R. Trifari

[57] ABSTRACT

A method of electrographic recording, in which charge images are formed by image electrodes on one side of a record carrier, the images being developed on the other side of the record carrier. The (conducting) developer also serves as the counter electrode during the formation of the charge images.

13 Claims, 4 Drawing Figures

ELECTROGRAPHIC RECORDING METHOD AND DEVICES FOR PERFORMING THIS METHOD

The invention relates to an electrographic recording method in which a charge image is formed on a record carrier by means of gas-discharge phenomena while using suitably shaped image electrodes and counter electrodes which are mainly flat.

In known electrographic recording methods use is often made of a special record carrier which usually consists of a layer of electrically conducting material on which an insulating layer is deposited. For generating charge images by means of gas-discharge, this record carrier is passed through a gap between electrodes, the image electrodes being situated at a very small distance above the insulating layer, and usually even being in contact therewith. The said special record carrier increases the cost of the method and, in addition, often does not satisfy the quality requirements imposed on electrographically printed products. The image formed is often transferred to a suitable image carrier in a next phase of the method, before or after development of the latent charge images. In this case a record carrier is desired which can be used a number of times. Proposals have also been made to perform the successive stages, i.e. generation of the charge image, development by means of a powder-like developer, transfer of the powder image, removal of the powder-image residues, and erasing of the charge image, on an endless record carrier as is the case in the electrophotographic Xerox process.

In contrast with the electrophotographic process, however, even the most minute powder-image residues have an adverse effect due to the small electrode gap in the electrographic generation of charge images, so that the described concept is difficult to realize. The invention has for its object to provide a method which obviates the said drawback and which, moreover, can be performed by means of an exceptionally simple and compact device.

The method according to the invention is characterized in that on the record carrier, made of a homogeneous, dielectric recording material, gas discharges are ignited on both sides simultaneously, in the form of the images to be recorded, for generating the latent charge images, said charge images being developed, by means of a powder-like developer, on the side of the record carrier which is remote from the image electrodes, the other side of the record carrier bearing on a plate having a favorable electrical conductivity.

Figure 1A:
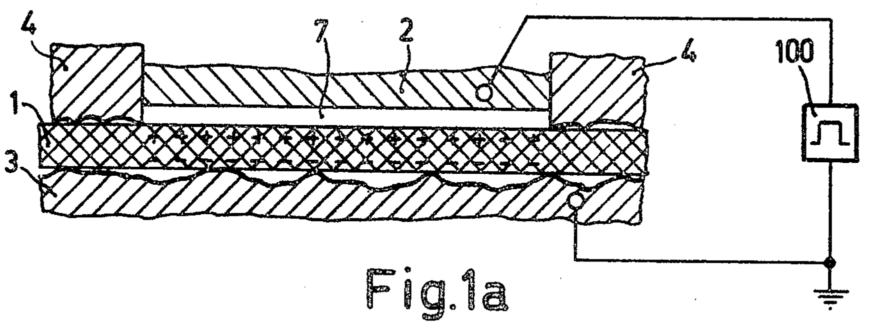
Figure 1B:
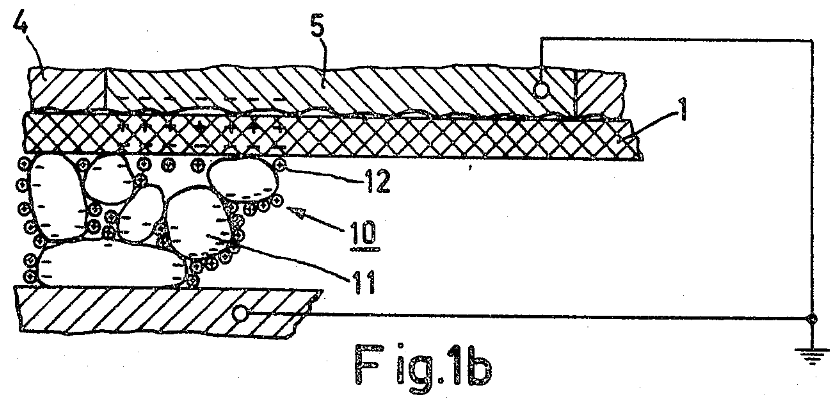
Figure 1C:
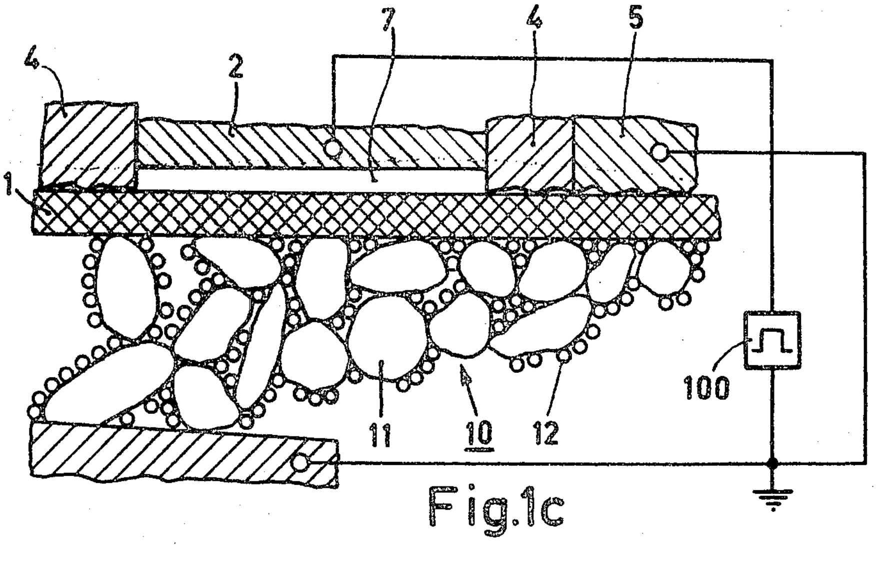
Figure 2:
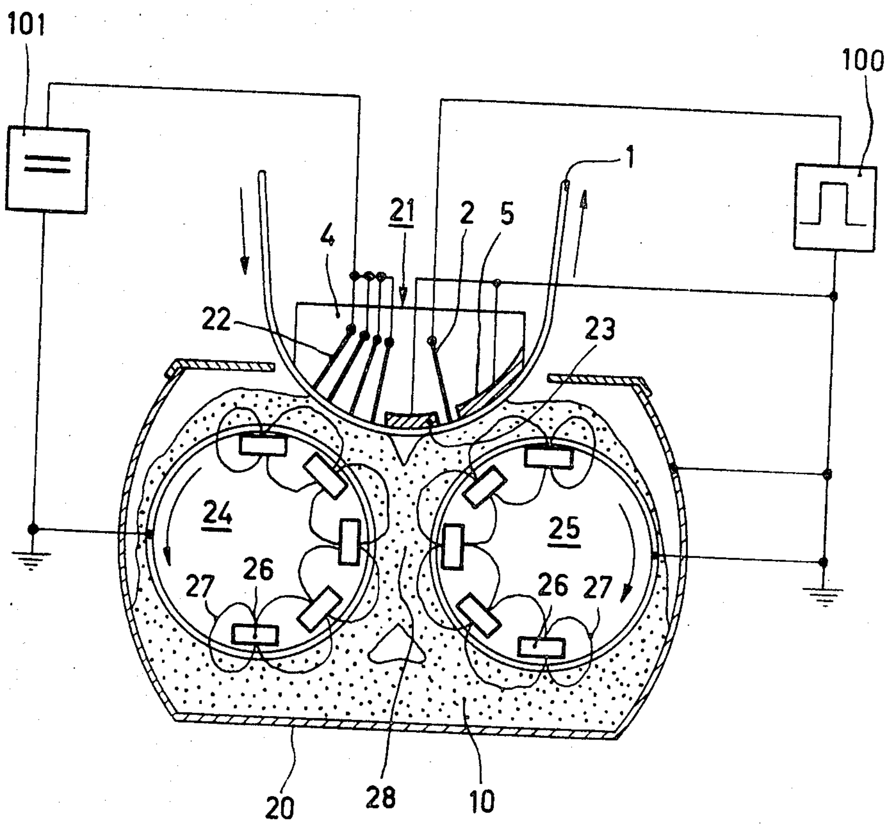

In order that the invention may be readily carried into effect, one embodiment thereof will now be described in detail, by way of example, with reference to the accompanying diagrammatic drawing, in which:

FIGS. 1*a* and 1*b* are diagrammatic views of two stages of an embodiment of the method according to the invention, FIG. 1*c* is a diagrammatic view of a variant of this method, and FIG. 2 is a sectional view of a device for performing the method shown in FIG. 1*c*.

The FIGS. 1*a*, 1*b*, and 1*c* show a record carrier 1 which consists of a thin synthetic-resin foil. Due to their manufacturing process, many thermoplastic foils have a very smooth surface, as is indicated in the FIGS. 1. This property makes these foils very suitable for use as a record carrier for repeated use in a cyclic process, because the smoothness counteracts the wear and also because the pigmentation powder cannot adhere very well to these foils. The thickness of the foil is a measure of the capacitance active during charging. This capacitance preferably amounts to from 8 μm to 40 μm, so that favorable charging and development are ensured. In view of the relationship between the ignition voltage and the width of the air gap of the gas discharge, the image electrode 2 must be arranged at a distance of approximately 7 to 10 μm above the record carrier 1. In an electrode system for matrix printing, having a comparatively fine structure, this can be achieved in that a series of thin needles is embedded in a body 4 of a synthetic resin-material. After the end face of the body 4 has been ground smooth, a portion of the pins is removed by etching. In this way a geometrical limitation of the gas discharge space is produced, which guarantees a high resolution power of the electrostatic charge image. In FIG. 1*a* a thickness of 20 μm is assumed for the record carrier 1 and a diameter of 200 μm for the needle 2 in order to illustrate the mutual relationships of the dimensions. The flat counter electrode 3 must then have a surface roughness of approximately 10 μm, so that a geometrical symmetry exists with respect to both air gaps. Under these circumstances charge images can be generated by a voltage pulse of approximately 1 kV from a generator 100. FIG. 1*a* shows the charge accumulated on both foil surfaces. It is obvious that the charge polarities can be reversed by reversing the polarities of the generator. It is alternatively possible to use a combination of a recording material which is rough on both sides and smooth electrodes instead of the device shown in FIG. 1*a*, if the associated and partly mentioned drawbacks are acceptable.

It is to be noted that the same device can be used for erasing a charge image. For this purpose, the pulse generator 100 is replaced by a direct-voltage source supplying a voltage which is closely below the ignition voltage of the system, the polarity of the voltage being opposed to that of the pulse voltage. The electrode 2 may then consist of a plate which is arranged at right angles to the direction of movement of the record carrier. In order to enhance the chance of ignition, i.e. the reliability of the erasing process, it is advisable to use a number of parallel plates.

It will be obvious that the latent charge images can be optionally developed on one or on both sides of the record carrier by means of a suitable developer. Cyclic electrographic recording, however, is made possible according to the invention in that pigmentation particles of the developer are in principle prevented from coming into contact with the image electrode 2. To this end, the counter charge is developed which is present on the side of the record carrier 1 which is remote from the image electrode 2, the surface charge on the side of the image electrode 2 being compensated for by influence in a conducting plate 5, as is shown in FIG. 1*b*. In this way approximately the same field forces occur during development as with the conventional method in which use is made of a record carrier provided with a conducting layer. One might ask whether the powder-image residues do not contaminate the counter electrodes 3 at the charge or erase locations, respectively. Past experience, however, has shown that considerable amounts of pigmentation-powder residues can be tolerated if the counter electrodes 3 are constructed as rotating rollers made of, for example, a conducting rubber material. The advantage of the method is that the image electrodes 2, determining the structure and the resolution power of the image, are separated from the pigmentation powder 12 by the record carrier 1. FIG. 1*c* shows how the method can be further simplified. In this Figure the developer 10 takes over the function of the counter electrode 3. The grain size of the carrier particles 11, which are assumed to be conducting, is chosen to be such that the said symmetry of the two air gaps is ensured when the record carrier is charged. Also in this case charging and developing are successively performed because the mobility of ions is larger than that of the pigmentation particles 12, so that first a transport of ions from the carrier grain 11 to the record carrier 1 is effected, followed by a transport of pigmentation particles in the same direction. These two processes can no longer be strictly separated in space. The developing process, however, requires a rather long traject for supplying and transferring the pigmentation particles 12, the said traject being marked in the FIG. 1*c* by the conducting plate 5. Nevertheless, the combined device for performing both processes according to FIG. 1*c* can be made substantially more compact than two individual stations as shown in FIGS. 1*a* and 1*b*.

An important aspect is that the two processes of charging and developing by means of the same device as shown in the FIG. 1*c* are reversed if, instead of the voltage pulse, a direct voltage having the opposite polarity and a suitable value is applied between the carrier grains 11 and the electrode 2, it being permissible to replace the image electrode 2 by a number of parallel plates. It is not completely clear (but irrelevant for the success of cleaning) in which sequence the pigmentation particles and the charge of the image residue on the record carrier 1 are transferred to the carrier grains 11. For successfully performing this combined cleaning process, it is necessary, of course, that a sufficient amount of carrier grains is supplied for taking up the pigmentation particles, so that generally a transport device for the developer will be required.

FIG. 2 is a diagrammatic sectional view of a device for performing the method according to the invention, comprising a magnetic transport device for a magnetizable developer. A chamber 20 serves for storing the developer 10. The bent rear wall 21 of this chamber forms a combined write/erase head, and also serves to support the record carrier 1, which is displaced as an endless loop in the direction of the arrows by known transport means (not shown). Any desired transfer of the image to an image carrier can also be performed according to known techniques. Embedded in the insulating material 4 of the rear wall 21 are the needle-shaped image electrodes 2, plate-shaped electrodes 22 for erasing, and the metal bodies 23 and 5 which serve for avoiding tribo-electrical charging of the record carrier 1 and for charge compensation by influence in the development area. The chamber 20 comprises two known magnetic transport devices 24, 25 for the developer. Each of these devices consists of a rotary, hollow cylinder which is driven in the direction of the arrow in FIG. 2 (by means not shown). Inside the cylinder a number of permanent magnets 26 are permanently mounted such that the magnetic field configuration 27 shown in FIG. 2 is produced. The hollow cylinders 24, 25 transport developer to the cleaning and erasing area on the one side, and to the charging and developing area on the other side. Furthermore, an exchange takes place in the area 28 between the developer enriched with pigmentation particles in the cleaning area, and the developer exhausted in the developing area, it being possible to intensify the said exchange by imparting different speeds of rotation to the hollow cylinders or by using additional means (not shown).

In addition to the transport devices 24, 25, similar combinations of magnetic transport means can also be present for other purposes. The frictional movement between the record carrier and the developer which is necessary for achieving the cleaning effect, can also be advantageously produced, for example, by a so-termed magnetic magnet brush. This is a body whose surface is covered with permanent magnets which are arranged according to a checkerboard pattern, so that the surface alternately shows north-poles and south-poles. In order to stimulate optimum development, a strong magnet may be arranged near the metal plate 5, the said magnet causing, as is known, a turbulence in the chamber when the record carrier is moved. The electrical means denoted by 100, 101 in the Figures and serving for generating the desired electrical fields, are generally known and need not be further described.

What is claimed is:

1. The method of electrographic recording in which charge images are formed on a record carrier by means of gas-discharge phenomena, image and counter electrodes are provided along with a band-like record carrier disposed between the electrodes, said carrier being composed of a homogeneous dielectric recording material, said method comprising the steps of:

(A) igniting substantially simultaneously gas discharges on each side of said band-like carrier for the purpose of forming images to be recorded thereon; and (B) developing said charge images by means of a powder-like developer disposed on the carrier side which is remote from said image electrodes, the other side of said carrier bearing on a plate having a favorable electrical conductivity.

2. The method of claim 1, wherein the developer is composed of a mixture of electrically conducting carrier particles and tribo-electrically charged insulating pigmentation particles.

3. The method of claim 2, wherein said mixture also serves as a counter electrode in generating charge images.

4. The method of claim 3, wherein a record carrier is used which is suitable for repeated use, and wherein residues of an image formed by the developer on the side of the carrier remote from said image electrodes is removed after transfer of the image to an image carrier for the purpose of obtaining a copy.

5. The method of claim 4, wherein the developer is also used for removing the image residues and for generating an electric field having a sufficient intensity for removing the charge image for the purpose of preparing the carrier for another recording cycle.

6. The method of claim 5, wherein a portion of the developer serving to develop the charge images is mixed with a portion of the developer serving to remove the image residues.

7. The method of claim 6, wherein the carrier particles in the developer consist of magnetizable material having an average particle size ranging from approximately 30 $\mu$m to 200 $\mu$m.

8. Apparatus for electrographic recording in which charge images are formed on a record carrier by means of gas-discharge phenomena, comprising:

A. a chamber containing developer having a rear wall supporting said record carrier and forming a write/erase head;

B. image electrodes and erasing electrodes disposed in said rear wall;

C. transport devices disposed in the chamber for transporting the developer to areas within the chamber for charging and developing the record carrier and for transporting the developer to areas within the chamber for the purpose of cleaning and erasing said carrier, said transport means serving the additional Purpose of mixing the developer; and D. electrical means connected to said electrodes, said chamber, and said transport means for generating electrical fields for image production and erasure.

9. The apparatus of claim 8, wherein said transport devices are a pair of rotating cylinders containing permanent magnets.

10. The apparatus of claim 8, wherein said erasing electrodes are plate-shaped.

11. The apparatus of claim 8, wherein the rear wall of said chamber contains insulating material for electrically isolating said electrodes and other plate elements.

12. The apparatus of claim 8, wherein the image electrodes are needle-shaped.

13. The apparatus of claim 8, wherein the rear wall of said chamber contains metal bodies for avoiding tribo-electrical charging of the record carrier and for charge compensation.

* * * * *